Dec. 3, 1963    W. M. LANHAM    3,113,063
METHOD OF DRYING PHOSPHORUS-CONTAINING ACIDS
Filed Dec. 28, 1960
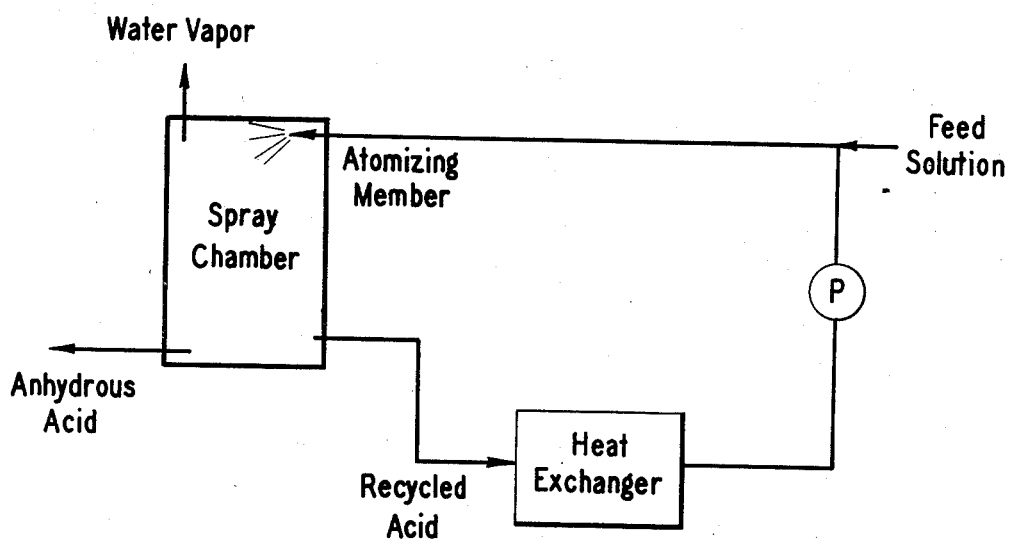
INVENTOR.
WILLIAM M. LANHAM
BY
ATTORNEY

United States Patent Office 3,113,063
Patented Dec. 3, 1963

3,113,063
METHOD OF DRYING PHOSPHORUS-CONTAINING ACIDS
William M. Lanham, Charleston, W. Va., assignor to Union Carbide Corporation, a corporation of New York
Filed Dec. 28, 1960, Ser. No. 78,861
3 Claims. (Cl. 159—48)

This invention relates to the drying of phosphorus-containing acids, and more especially it concerns a method for the spray drying of phosphoric acid or phosphorous acid from aqueous solutions thereof with recovery of the acid in substantially anhydrous form.

The variety and volume of applications for the use of phosphorous acid and phosphoric acid, including derivatives thereof, have led to a growing industrial demand for a more concentrated product than the commercially available aqueous solutions of 70 to 85% acid. Among industries requiring the use of anhydrous phosphoric acid, for example, are those involved in the manufacture of flame retardants and intermediates for the preparation of lubricating oil additives. Similarly, phosphorous acid as an article of commerce finds extensive use as a reducing agent.

The present methods for obtaining anhydrous phosphorous acid or phosphoric acid have been handicapped to some extent due to the expense and/or difficulty involved in completely removing from the acid mass the last traces of water. For example, the commercial method of drying phosphoric acid by means of phosphorus pentoxide absorption is difficult since the phosphorus pentoxide becomes covered with a film of phosphoric acid which seals off the unreacted pentoxide. More recently, a proposed method which has been suggested involves the steps of incorporating an oxidizing agent into an aqueous solution of phosphoric acid, spreading the solution over an extended area in the form of a liquid sheet, applying heat to the liquid sheet by infrared radiation, cooling the liquid to obtain crystallization and thereafter recovering the resulting crystals by centrifugation. Such methods, generally, are unsatisfactory in view of the several operations which lessen the efficiency of the procedure and add substantially to the cost of the ultimate product. Similarly, in the preparation of phosphorous acid by the hydrolysis of phosphorus trichloride wherein water is present as a concentrated solution of hydrochloric acid, several concentrating operations are necessary which limit economy of plant procedure.

The present invention is predicated on the discovery that anhydrous orthophosphoric acid or orthophosphorous acid can be easily obtained from aqueous solutions thereof by a relatively simple and efficient method of spray drying. It has been found that when an aqueous solution of either acid is atomized in a spray chamber under reduced pressure at temperatures between 60° C. and 200° C., the water is effectively separated from the acid to provide a substantially anhydrous product. As compared to prior art procedures, the method of the present invention provides an economical and feasible means whereby anhydrous phosphorus-containing acids of the above type can be readily prepared which thus broadens considerably their realm of utility.

The equipment to be utilized in carrying out the present invention is generally well known in the art and can be arranged as shown in the accompanying drawing.

The preparation of anhydrous phosphoric acid as an illustrative embodiment is initiated by feeding an aqueous solution of phosphoric acid to an atomizing member within a spray chamber wherein atomization of the solution is effected. The solution can be atomized near the top of the chamber although the optimum point for introduction and dispersion of the mixture will vary, the most effective area usually being somewhere in the upper center half of the chamber as best determined experimentally. Within the spray chamber the water from the spray is vaporized and passes overhead to a convenient outlet where it may be cooled and collected as desired. The phosphoric acid is rapidly dried and flows downward to the bottom of the chamber where it may be discharged, if desired, through a filter for removal of inerts, etc. The phosphoric acid issuing from the spray chamber is substantially anhydrous and is advantageously recycled through the system for a sufficient period of time to insure complete removal of trace amounts of water. The liquid material may be circulated through a heat exchanger and conveniently recycled to the spray chamber by means of a high capacity centrifugal pump or other suitable means.

The temperature and pressures employed within the spray chamber are critical to the extent that the water must be vaporized without effecting a decomposition of orthophosphorous acid into phosphine or a dehydration of orthophosphoric acid into pyro- or metaphosphoric acid. The temperature employed thus varies with the vapor pressure of the equeous solution being dried and, in general, will range from 60° C. to 200° C. under reduced pressures of 1 mm. to 400 mm. Hg absolute. The preferred temperature ranges from about 70° C. to 140° C. under an absolute pressure of 1 mm. to 50 mm. Hg.

While the invention is described herein in connection with phosphoric acid, it is understood to be in no way restricted to that embodiment but to be applicable also to aqueous solutions of phosphorous acid. The use of phosphoric acid thus serves as an illustration of the basic principle of the invention according to which aqueous solutions of either phosphoric acid or phosphorous acid can be dried. It is to be also understood that the water content of the aqueous solution which is spray dried is not a critical aspect of the invention. Thus in various manufacturing processes the water content of phosphoric acid or phosphorous acid will vary considerably, up to 50%, for example, depending upon the type and character of the process employed.

The apparatus utilized for the spray drying operation is not a primary consideration of the invention. The use of plant size apparatus embodying the invention has shown that various means can be employed. One convenient form of a spray chamber, for example, comprises a still kettle suitably lined with glass, ceramic or other acid resistant material, to which temperature control means are provided for heating to a predetermined temperature. Means are also provided for evacuating the kettle to establish a predetermined pressure. The atomizing member is located within the top of the chamber and a discharge conduit for removal of phosphoric acid is mounted at the bottom thereof. From the discharge conduit, recycle and heat exchange means are provided for circulating the liquid phosphoric acid to the atomizing member. Water vapor from the spray chamber is taken off by overhead conduit means which lead to means for cooling and collection of the condensate.

The atomizing member can be any suitable means, such as a fog nozzle, for projecting, propelling or otherwise dispersing the aqueous phosphoric acid solution into fine droplets.

The method of the invention may be accomplished in a continuous or batchwise fashion. For most economical and efficient operation, it is preferred to continuously supply and recycle the aqueous solution of acid to the spray chamber. The liquid concentrate which is recovered is essentially anhydrous and may be sent to storage where it crystallizes to a solid mass on cooling.

In a typical procedure illustrative of the above method, an aqueous solution of phosphoric acid was dried in the following manner.

Example 1

A sixty gallon, glass-lined kettle was employed to dry an aqueous solution of orthophosphoric acid at a temperature of 100° C. under a pressure of 15 mm. Hg absolute. The liquid feed, comprising 325.5 gallons of 85% aqueous orthophosphoric acid, was introduced and sprayed by means of a fog nozzle located near the top of the kettle. Vaporized water was vented overhead and the liquid stream discharged from the bottom of the kettle was continuously circulated to the fog nozzle through a heat exchanger at a rate varying from 15 to 20 gallons per minute. After continuously introducing and circulating the liquid feed over a period of 10 hours, 237.5 pounds of phosphoric were recovered which assayed better than 98% $H_3PO_4$.

What is claimed is:

1. A process for recovering a phosphorus containing acid of the group consisting of orthophosphorous and orthophosphoric acid in substantially anhydrous state, which process comprises the steps of atomizing an aqueous solution of said acid to form a spray wherein the said solution is dispersed into exceedingly fine droplets of a size in the order obtained by fog-nozzle atomization and where said spray is formed within a zone maintained at a temperature from about 60° C. to 200° C. at a pressure of from about 1 mm. to 400 mm. of mercury absolute, vaporizing the water from said spray until substantially all of the last traces of water are removed from the spray, removing the water from said zone as overhead, and collecting the substantially anhydrous acid.

2. The method of claim 1 wherein the temperature is from about 70° C. to 140° C. under a pressure of 1 mm. to 50 mm. mercury absolute.

3. The method of claim 2 wherein the acid is an aqueous solution of phosphoric acid.

References Cited in the file of this patent
UNITED STATES PATENTS

| | | |
|---|---|---|
| 1,215,140 | Giller | Feb. 6, 1917 |
| 1,442,318 | Whittier | Jan. 16, 1923 |
| 1,597,984 | La Bour | Aug. 31, 1926 |
| 2,595,198 | Lefforge | Apr. 29, 1952 |
| 2,807,521 | Lambe | Sept. 24, 1957 |
| 2,917,367 | Hodges | Dec. 15, 1959 |
| 2,933,372 | Manning | Apr. 19, 1960 |